April 26, 1960
A. D. PALMER
2,933,818
ELLIPSE GUIDES
Filed Nov. 7, 1955
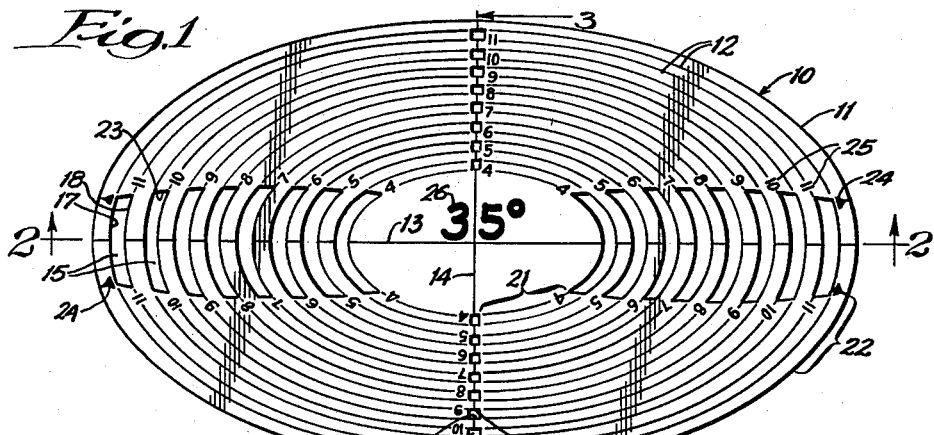
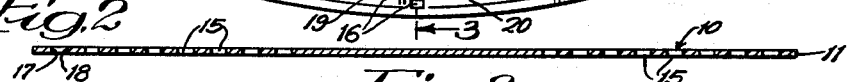
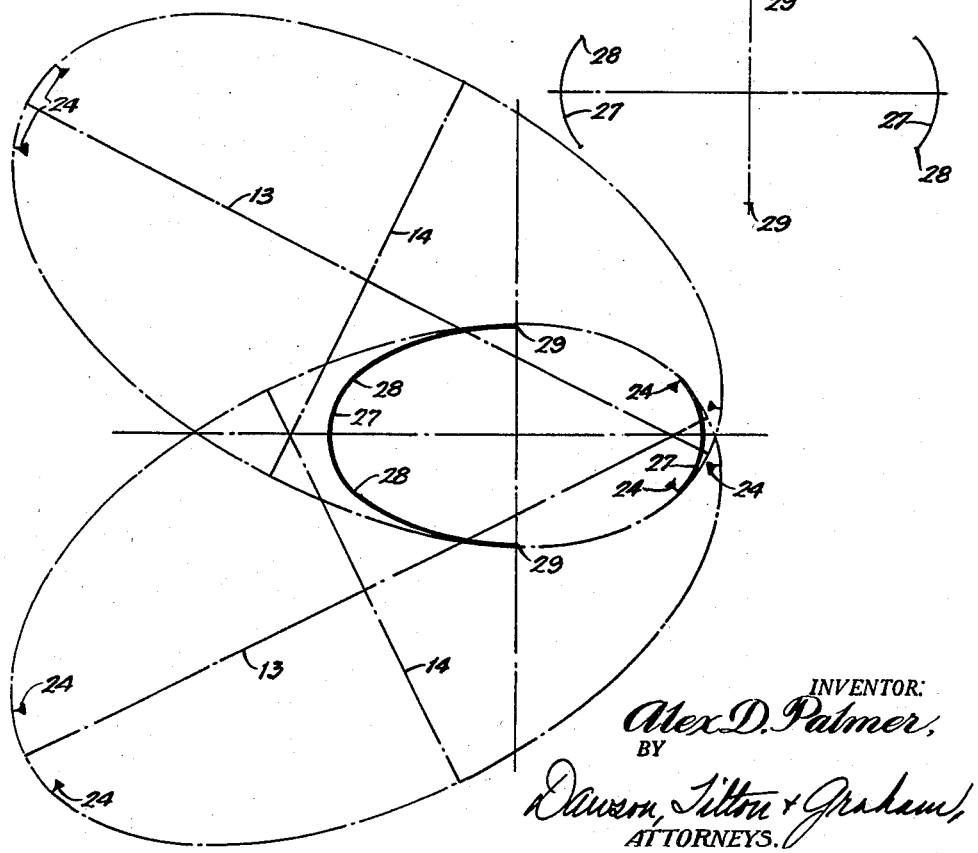
INVENTOR:
Alex D. Palmer,
BY
Dawson, Tilton & Graham,
ATTORNEYS.

United States Patent Office 2,933,818
Patented Apr. 26, 1960

2,933,818

ELLIPSE GUIDES

Alex D. Palmer, Chicago, Ill.

Application November 7, 1955, Serial No. 545,244

2 Claims. (Cl. 33—174)

This invention relates to ellipse guides, and more specifically to instruments for accurately drawing true ellipses of different sizes and degrees.

As well known by draftsmen and artists, considerable difficulty is often encountered in accurately drawing true ellipses, and especially ellipses having longitudinal dimensions of approximately four inches or more. The problems of drawing small ellipses—that is, ellipses less than four inches in length—are greatly reduced by the use of commercially available templates having groups of elliptical openings or "cut-outs" therein, since these templates are generally quite accurate and may be quickly and easily positioned. However, it is believed apparent that for the drawing of larger ellipses, such templates would be awkward to manipulate and use. Consequently, no templates for accurately drawing true ellipses larger than about four inches in diameter are commercially available at the present time.

In order to accurately draw a large ellipse, an artist might resort to one of the ellipse constructing procedures which are usually long and tedious. For example, one ellipse constructing technique, commonly called the concentric circle method, requires the plotting of numerous points and the connecting of these points with a curved line to form the desired ellipse. Or, instead, the artist might use a device commonly called an ellipsograph which requires taking measurements, adjusting various parts of the instrument and positioning the device carefully on the paper. It is obvious that these elaborate preparations might become tiring where a number of ellipses of different sizes must be drawn.

Of course, where accuracy is not essential, an artist may use one of the simplified constructing techniques or may use one of a number of commercially available ellipse drawing guides to approximate a true ellipse. Some of these guides are in the shape of a quarter ellipse, while others have the general configuration of semi-ellipses. In either case, since these guides represent only partial ellipses, an entire ellipse cannot be viewed and oriented upon the paper before it is drawn thereon. Furthermore, since such instruments only approximate true ellipses, it is believed apparent that they sacrifice accuracy for convenience, and are unsuitable where true ellipses must be represented.

An object of the present invention is to provide a guide for accurately drawing ellipses of different sizes which are true ellipses insofar as can be seen with the eye when compared with geometrically constructed ellipses. Another object of this invention is to provide a relatively simple drawing guide for rapidly and accurately drawing true ellipses, such ellipses generally being larger than approximately four inches measured along their major axes. A further object is to provide a simple and inexpensive ellipse guide which will enable the user, before drawing an ellipse, to see at a single glance where all parts of the desired ellipse will fall. A still further object is to provide an ellipse guide which may be easily manipulated and which is adapted for accurately drawing a plurality of true ellipses of different sizes and of the same degree.

An additional object is to provide a simple and inexpensive guide of sheet material for drawing ellipses of different sizes and of the same degree, other similar guides of different shapes being adapted for drawing ellipses of different degrees. Other objects will appear from the specification and drawings, in which:

Figure 1 is a top plan view of an ellipse guide embodying the present invention; Figure 2 is a longitudinal sectional view taken along lines 2—2 of Figure 1; Figure 3 is a cross sectional view taken along lines 3—3 of Figure 1; Figure 4 illustrates an initial step in drawing an ellipse using the ellipse guide of the present invention; and Figure 5 illustrates the completion of an ellipse drawn by use of the guide shown in Figure 1.

In the embodiment of my invention shown in Figure 1, the ellipse guide is generally represented by the numeral 10. Guide 10 comprises a perforate sheet of a preferably transparent material, such as cellulose acetate, cut in the shape of a 35° ellipse. While a 12" guide is shown in the drawings, it will be understood that this is an arbitrary limit, and that the guide may be of any suitable size and degree.

An ellipse may be defined as a projection upon a plane of a circle passing obliquely to that plane. For example, if a vertical cylinder is cut at an angle between zero and 90°, the cut portion of the cylinder will define an ellipse. If the cutting plane is inclined at an angle of 35° from the horizontal, then the ellipse formed thereby is termed a 35° ellipse and will have a shape similar to the configuration of the ellipse guide shown in the drawings.

As best illustrated in Figure 1, guide 10 is equipped with an outer curved edge or border 11 which defines an outer ellipse. A plurality of curved lines 12 are printed or scored upon the sheet, and represent a series of concentric ellipses of smaller size and of the same degree as the outer ellipse. These lines provide a means for initially orienting an ellipse of the desired size upon a drawing where the ellipse to be drawn must be located or positioned with reference to other elements of the drawing. Preferably, the guide is also provided with lines 13 and 14 indicating the major and minor axes, respectively, of the concentric ellipses. These axis lines also aid in accurately positioning the ellipse guide to orient the desired ellipse.

It will be seen that consecutive concentric ellipses upon the guide differ in size from adjacent ellipses of the series by one-half inch steps, measured along the major axes of those ellipses. Therefore, a total of seventeen concentric ellipses, including the outer ellipse, are provided by guide 10, and range from 4" to 12" in maximum diameter. This particular number of concentric ellipses is arbitrary and is based upon practical considerations so that a greater or smaller number of ellipses may be provided if such is deemed necessary or desirable.

Two groups of openings or slots 15 extend outwardly from the smallest ellipse toward the largest outer ellipse along the common longitudinal or major axis thereof. Similarly, two groups of smaller openings or slots 16 extend outwardly along the common minor axis of the concentric ellipses. As shown in Figure 1, the openings along the major and minor axes are equipped with curved outer and inner edges, 17, 19 and 18, 20, respectively. Therefore, corresponding openings of each group have opposite edges which define portions of a pair of adjacent concentric ellipses. For example, the inner curved edges 18 and 20 of the outermost openings 15 and 16 represent four portions of an 11" ellipse, while the outer edges 17 and 19 of the same openings define corresponding portions of an 11½" ellipse.

I have found that in a series of concentric ellipses of the same degree within a given range of sizes, there are curved portions common to all of the ellipses. For instance, the curved section of the smallest ellipse indicated by numeral 21 is identical to the curved portion of the largest ellipse, represented by numeral 22. To state this relationship differently, a portion of the curve of one ellipse is duplicated somewhere along the curve of a larger ellipse of the same degree where the ellipses fall within a given range of sizes. Hence, the outer ellipse defined by border 11 has curved portions which are identical to curved sections of each of the smaller concentric ellipses.

Conversely, there are curved portions of each of the concentric ellipses which are common only to a single ellipse. These distinctive portions are defined by the inner and outer edges of the curved slots 15. Thus, the inner edges of the openings 15 for the 11" ellipse define portions of that ellipse which appear only on diametrically opposite sides of that ellipse along the major axis thereof, and are present in none of the other concentric ellipses.

It may be noted that as one characteristic of this template, the lateral or side edges 23 of the curved openings 15, as they appear in series in each of the groups along the major axis of the concentric ellipses, define pairs of broken, curved lines which converge slightly at their end portions. On templates of high degree, such as 60°, these curves are pronounced, while on templates defining ellipses of lower degree (such as 15°) these curves are nearly flat.

Along the border of the outer ellipse, and adjacent the lateral edges 23 of outermost openings 15, are four indicator marks 24. These marks may be linked upon the elliptical sheet or may be grooved thereon, and serve to indicate the portions of the outer ellipse which are common to the smaller concentric ellipses, and to delimit those portions of the outer ellipse which are common only to that particular ellipse. The guide or template 10 may also be provided with numerals of indicia 25 representing the maximum diameters of some or all of the concentric ellipses.

Preferably, each template bears indicia 26 indicating the particular degree of angle of vision of the concentric ellipses. While the template shown in Figure 1 is represented as a guide for drawing 35° ellipses, it is to be understood that similar guides of different sizes may be provided for different degrees or angles of sight.

*Operation*

The operation of the present invention is shown in Figures 4 and 5 of the drawings. The ellipse guide is first placed on a sheet of paper or other material upon which an ellipse is to be drawn. If a 6" ellipse is desired, then marks are drawn by means of a pencil or other marking device along the curved inner edges of openings 15 and 16, and adjacent the 6" marks carried by the ellipse guide. When the guide is withdrawn, the marks remaining upon the drawing paper will appear similar to those shown in Figure 4. As explained above, the two larger marks represent distinctive curved portions of a 35° ellipse which are common only to that particular ellipse.

After the initial marks have been made, the ellipse guide is turned to place one of the indicator marks 24 at the end 28 of one of the curved lines 27, and to align the remaining portion of the outer ellipse extending toward minor axis 14 so that portion passes through mark 29. It is to be noted that the particular indicator mark used lies in the same sector of the ellipse as the portion of curved opening 15 which defined the terminal portion 28 of curved mark 27. A line is then drawn along the outer edge of the ellipse guide to connect curved lines 27 and 29.

In a like manner, the remaining portions of the desired ellipse are drawn by connecting the initial curved lines. Figure 5 shows how the ellipse guide may be rotated in order to complete the drawing of one-half of a small 6" ellipse. Since the curved portions of the template's outer ellipse used in drawing the connecting portions of the 6" ellipse are also common to the smaller ellipse, a true 35° ellipse is produced. In a similar manner, any of the other concentric ellipses represented upon the template may be drawn upon a sheet of paper or other material.

While I have disclosed my invention in considerable detail for purposes of illustration, it will be understood by those skilled in the art that many of these details may be varied without departing from the spirit and scope of this invention.

I claim:

1. An ellipse guide comprising a sheet of material, said sheet having a curved border defining an outer ellipse, said sheet also being provided with groups of openings along the major and minor axes of said ellipse, said openings of each of said groups being curved and defining portions of concentric ellipses having the same degree as said outer ellipse, corresponding openings of different groups along the major axis defining curved portions common only to a single ellipse, the border of said sheet providing a curve having portions thereof spaced from the major axis and common to all of said concentric ellipses, said sheet being provided with indicia marks indicating the portions of said curved border common to all of said concentric ellipses.

2. A template for drawing ellipses comprising a sheet of plastic material, said sheet having a curved border defining an outer ellipse, said sheet also being provided with groups of openings along the major and minor axes of said outer ellipse, each of said openings have curved inner and outer edges defining portions of a pair of concentric ellipses having the same degree as said outer ellipse, said edges of said openings along said major axis each defining a distinctive curved portion common only to a single ellipse, the curved border of said sheet having curved portions thereof spaced from the major axis and common to all of said concentric ellipses, said sheet being provided with indicia marks adjacent the curved border thereof for indicating portions of said border common to all of said concentric ellipses.

References Cited in the file of this patent

UNITED STATES PATENTS

| | | |
|---|---|---|
| D. 141,882 | Matson | July 31, 1945 |
| D. 167,043 | Kintz | June 17, 1952 |
| 1,723,517 | McFadden | Aug. 6, 1929 |
| 2,478,071 | Agrillo | Aug. 2, 1949 |
| 2,499,935 | Suto | Mar. 7, 1950 |
| 2,512,492 | Fulton | June 20, 1950 |

OTHER REFERENCES

Tool & Die Journal, pg. 184, January 1945.